US009725026B2

(12) United States Patent
Ksiezopolski (10) Patent No.: US 9,725,026 B2
(45) Date of Patent: Aug. 8, 2017

(54) CUTTABLY REPLACEABLE SLIDE-OUT SEAL

(71) Applicant: LTI Flexible Products, Inc., Modesto, CA (US)

(72) Inventor: Edwin E Ksiezopolski, Granger, IN (US)

(73) Assignee: LTI Flexible Products, Inc., Modesto, CA (US)

( * ) Notice: Subject to any disclaimer, the term of this patent is extended or adjusted under 35 U.S.C. 154(b) by 0 days.

(21) Appl. No.: 14/996,861

(22) Filed: Jan. 15, 2016

(65) Prior Publication Data

US 2016/0207438 A1    Jul. 21, 2016

Related U.S. Application Data

(60) Provisional application No. 62/103,606, filed on Jan. 15, 2015.

(51) Int. Cl.
| | |
|---|---|
| *B60P 3/36* | (2006.01) |
| *F16J 15/02* | (2006.01) |
| *F16J 15/10* | (2006.01) |
| *B60P 3/34* | (2006.01) |

(52) U.S. Cl.
CPC ....... *B60P 3/36* (2013.01); *B60P 3/34* (2013.01); *F16J 15/021* (2013.01); *F16J 15/104* (2013.01)

(58) Field of Classification Search
CPC ...... B60P 3/36; B60P 3/34; B60P 3/341; F16J 15/104; F16J 15/021; F16J 15/0887; F16J 15/022; F16J 15/025; F16J 15/027; F16D 3/845; B60R 13/06
See application file for complete search history.

(56) References Cited

U.S. PATENT DOCUMENTS

| | | | | |
|---|---|---|---|---|
| 6,048,016 | A  * | 4/2000 | Futrell | B60P 3/34 296/165 |
| 7,380,854 | B1 * | 6/2008 | Hanser | B60P 3/34 296/26.12 |
| 7,614,676 | B2 * | 11/2009 | Ksiezopolski | B60P 3/34 296/171 |
| 7,614,677 | B2 * | 11/2009 | Ksiezopolski | B60P 3/34 296/171 |
| 8,366,168 | B1 * | 2/2013 | Ksiezopolski | E06B 7/2309 296/165 |
| 8,382,124 | B2 * | 2/2013 | Ksiezopolski | B60J 10/00 277/637 |

(Continued)

*Primary Examiner* — Eugene G Byrd
(74) *Attorney, Agent, or Firm* — Botkin & Hall, LLP (57) ABSTRACT

A resilient seal for living quarters that is for used sealing around a slide out room that has an aperture slidably receiving a slide out room. The resilient seal has a pair of attaching members extending along the inside and outside surfaces of the main living area wall at the aperture and includes a connecting member that extends between the attaching members and along the edge of the wall defining the aperture. A wiper seal extends from the connecting member for sealing against a wall of a slide out room. A bulb seal is integrally joined to at least one mounting portion that is bendable away from a groove on the mounting portion. The groove may be used for a separate bulb seal connectable thereto in the case the integral bulb seal is cut away. This facilitates replacement of the integral bulb seal.

13 Claims, 6 Drawing Sheets

(56) References Cited

U.S. PATENT DOCUMENTS

| | | | | |
|---|---|---|---|---|
| 8,408,625 B1 * | 4/2013 | Ksiezopolski | ............ | B60P 3/34 |
| | | | | 296/171 |
| 8,910,422 B2 * | 12/2014 | Siegel | ....................... | B60P 3/32 |
| | | | | 277/649 |
| 9,038,322 B2 * | 5/2015 | Ksiezopolski | ......... | F16J 15/022 |
| | | | | 52/79.5 |
| D741,231 S * | 10/2015 | Schoonover | ................. | D12/106 |
| 2002/0078634 A1 * | 6/2002 | McManus | ................. | B60P 3/34 |
| | | | | 52/67 |
| 2008/0116707 A1 * | 5/2008 | Boaz | ........................ | B60P 3/34 |
| | | | | 296/26.01 |
| 2008/0265618 A1 * | 10/2008 | Cadena | .................... | B60P 3/34 |
| | | | | 296/175 |
| 2014/0097578 A1 * | 4/2014 | Young | .................... | F16J 15/027 |
| | | | | 277/628 |

* cited by examiner

CUTTABLY REPLACEABLE SLIDE-OUT SEAL

BACKGROUND OF THE INVENTION

Recreational vehicles such as motor homes and travel trailers are commonly equipped with one or more slide out rooms that are retracted within the main living quarters when the unit is transported, but can be extended from the main living quarters to provide auxiliary space when the unit is parked. The seal typically has a resilient wiper portion to seal the sliding wall of the room and a resilient face sealing portion to mate with a flange on the room. Commonly, bulb seals are used as the face seal and extend around the aperture defined in the outside of the sidewall of the main living quarters through which the slide out room extends and retracts. This seal is engaged by a first flange on the exterior side of the slide out room to seal the gap between the slide out room and the main living quarters when the slide out room is retracted. Similarly, a second bulb seal extends around the aperture on the inside of the sidewall and is engaged by a second flange on the interior side of the slide out room when the slide out room is extended for use. Wiper seals are mounted on sidewalls adjacent to the aperture and are flexed against corresponding walls of the slide out room. The bulb seals seal the slide out room in the extended and retracted positions, and the wiper seal wipes against the slide out room as it is extended and retracted to prevent moisture and debris from entering the vehicle. Many designs are available that have a separate bulb seal that attaches to the main body of the seal. Others have an integral bulb sealing portion. The bulb sealing portion is prone to wear and damage. With an integral bulb seal design, the entire seal must be replaced, at significant expense and difficulty. An improved seal design is needed.

SUMMARY OF THE INVENTION

According to the invention, a resilient seal for mobile living quarters is provided for sealing around a slide out room of mobile living quarters having an aperture slidably receiving a slide out room. The resilient seal has a pair of attaching members extending along the inside and outside surfaces of the main living area wall at the aperture and further include a connecting member extending between the attaching members and along the edge of the wall defining the aperture. A wiper seal extends from the connecting member that flexes against the walls of the slide out room, and the connecting member further includes an accordion pleat for adjusting the distance between the attaching members to accommodate walls of different thicknesses.

Further, the bulb seal can be cut and removed from the seal base, revealing a tongue and groove interface that allows the installation of a commonly available bulb seal. This invention combines the ease of installation of a bendable bulb portion seal assembly and the serviceability of a separate bulb sealing portion.

BRIEF DESCRIPTION OF THE DRAWINGS

A preferred embodiment of this invention has been chosen wherein.

DESCRIPTION OF THE PREFERRED EMBODIMENT

Figure 1:
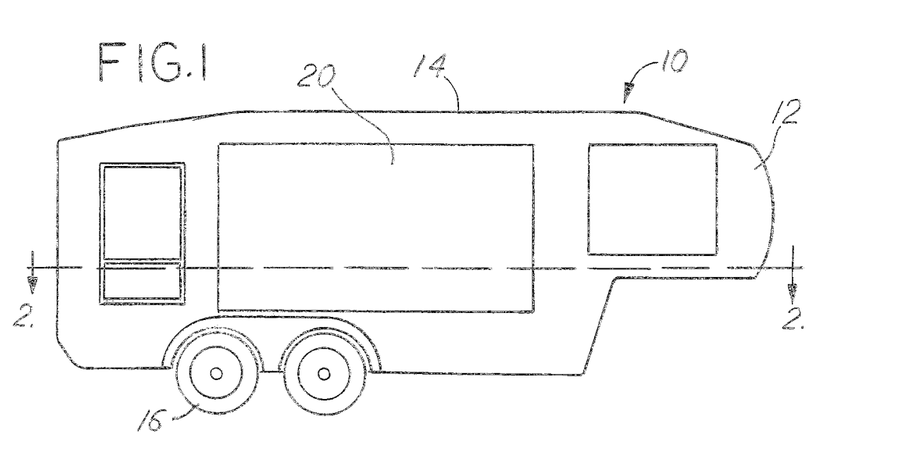
FIG. 1 is a side view of the trailer.
Figure 2:
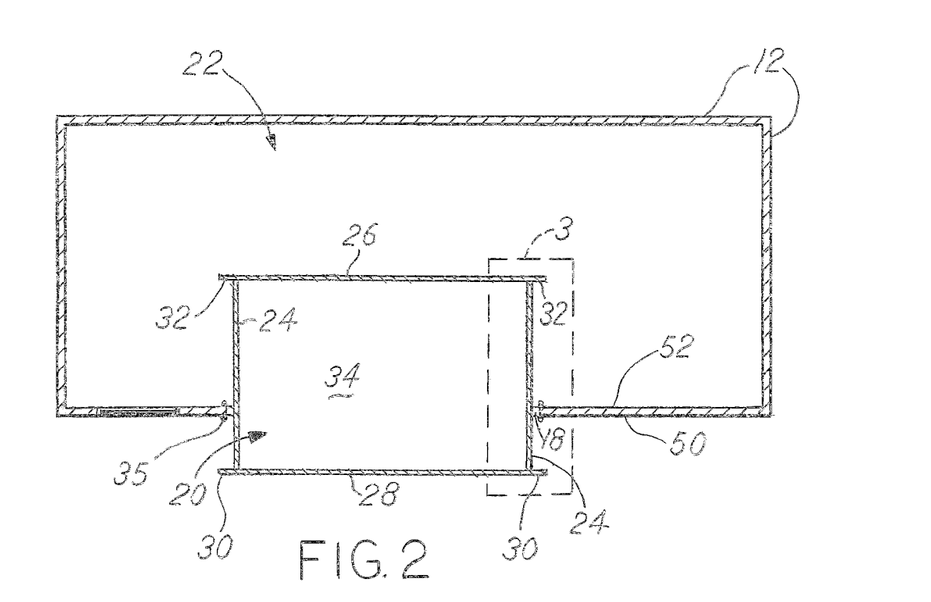
FIG. 2 is a cross-sectional view taken about the line 2-2 in FIG. 1.
Figure 3:
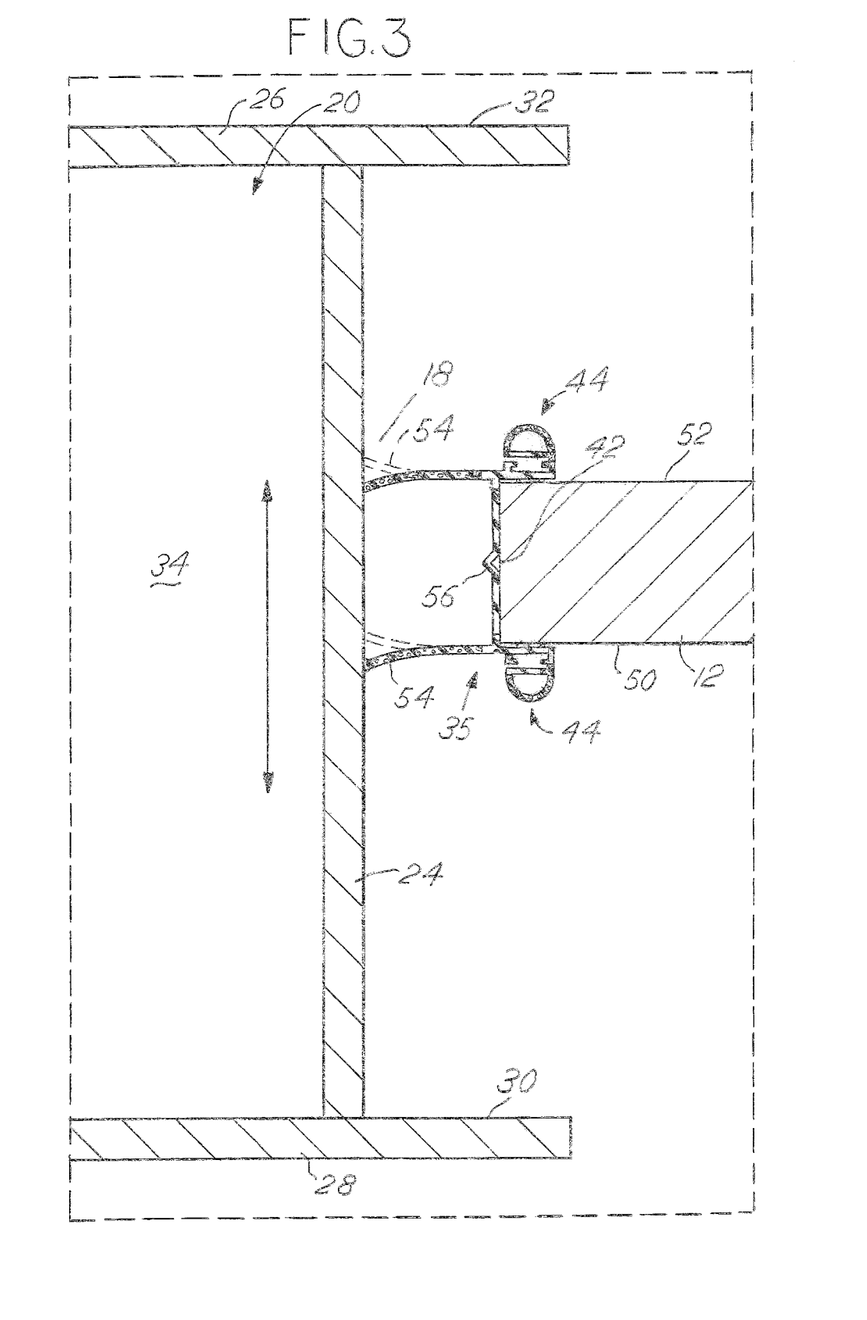
FIG. 3 is a magnified view of area 3 in FIG. 2.

Referring now to the drawings, mobile living quarters, such as the fifth wheel recreational vehicle 10 in FIG. 1, includes side walls 12 and a ceiling wall 14. The mobile living quarters 10 is mounted on wheels 16 for transport. An aperture 18 (FIG. 3) is provided in one of the side walls 12 and slidably receives a slide out room 20 (FIG. 1). This is best seen in the magnified view shown in FIG. 3. The side walls 12 and ceiling wall 14 cooperate to define an enclosed main living area generally indicated by the numeral 22 in FIG. 2. The slide out room 20 includes side walls 24, a ceiling wall 26, and a front wall 28. As known to those skilled in the art, the slide out room 20 is mounted for movement through the aperture 18, so that it may be retracted into the main living quarters 22 when the unit is transported, but can be extended from the main living quarters when the unit is parked, thereby providing auxiliary living space. The slide out room 20 is shown in FIGS. 2 and 3 at a point between the extended and retracted position. The slide out room 20 includes an exterior flange 30 extending around the side walls 24 and front wall 28. The slide out room 20 includes another flange 32, being an interior flange, extending around the side walls 24 and ceiling wall 26 at the ends thereof opposite the ends joined to the front wall 28. The side walls 24, ceiling wall 26 and front wall 28 cooperate to define an auxiliary living area 34, which is available for use when the unit is parked and the slide out room 20 is moved to the extended position.

It is necessary to assure that moisture, dirt, debris, etc. be prevented from entering the living quarters. A single part seal 35 is shown in FIGS. 2-6. A single side seal 48 is shown in FIGS. 7-10. Seals 35 are installed adjacent to the aperture 18. Each seal 35, 48 must provide sealing at the extended position, retracted position, and all intermediate positions. Accordingly, the seal 35 includes a bulb portion 44 mounted around the aperture on the exterior surface and the interior surface of the side wall 12 adjacent the aperture 18. When seal 48 is installed, it is typically installed on both the exterior surface 50 and the interior surface 52 (FIG. 3). A wiper seal 54 engages the side walls 24, ceiling wall 26, and front wall 28 of the slide out room to wipe against the walls as the slide out room 20 extends and retracts. Preferably, the seals 35, 48 are made continuously through an extrusion process and are consistent along their entire length, so that an appropriate length can be cut off and installed.

Figure 4:
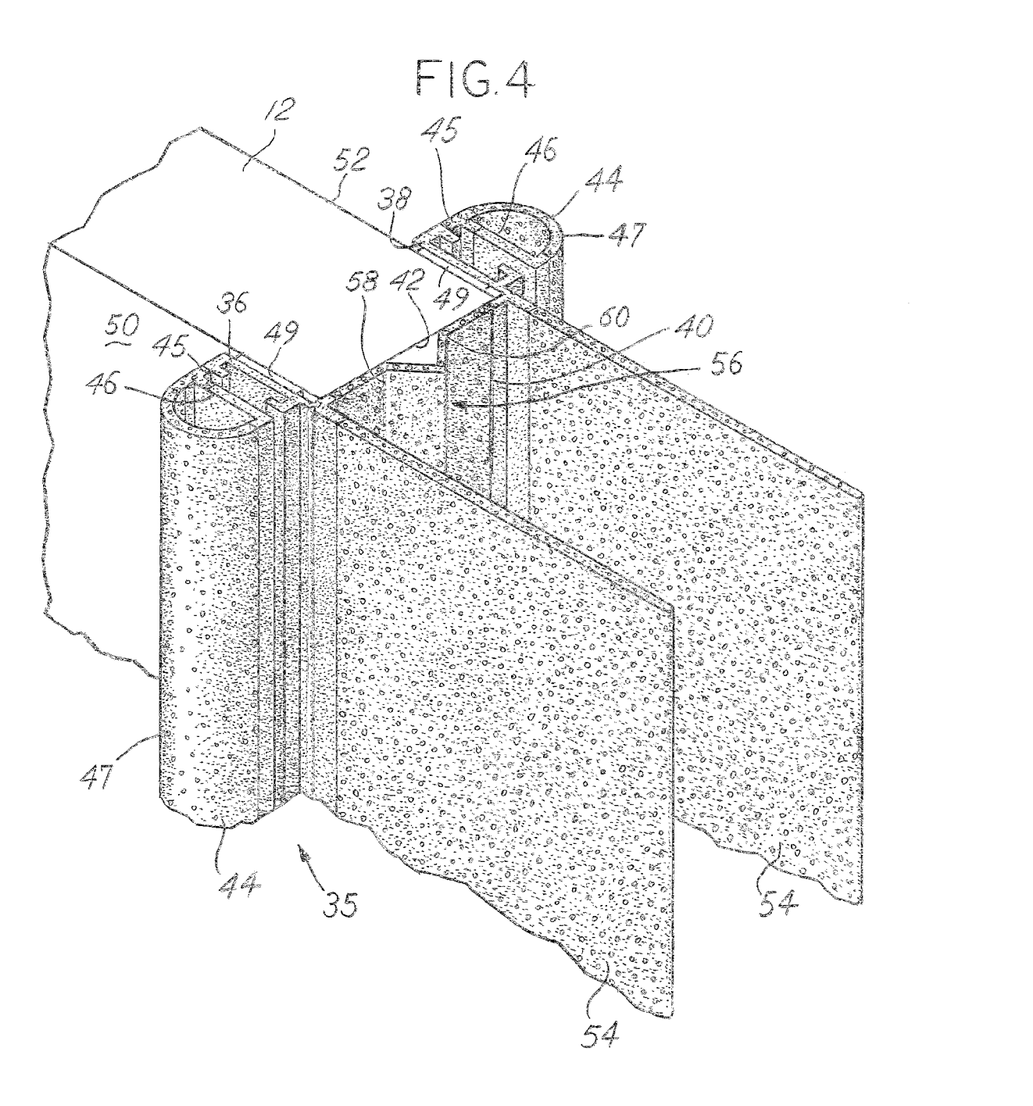
FIG. 4 is an isometric view of the seal installed on a sidewall.
Figure 5:
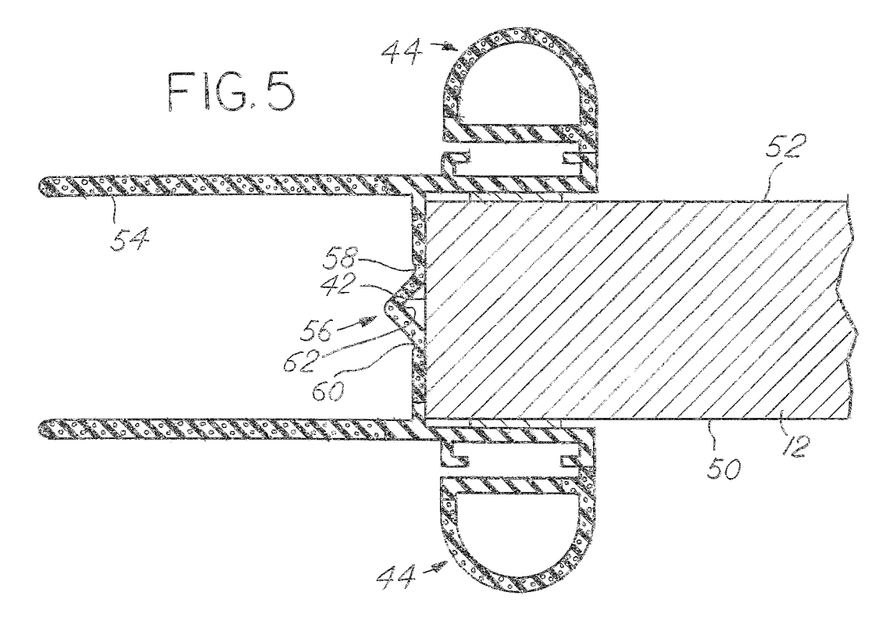
FIG. 5 is a sectional view of the seal shown in FIG. 4.
Figure 6:
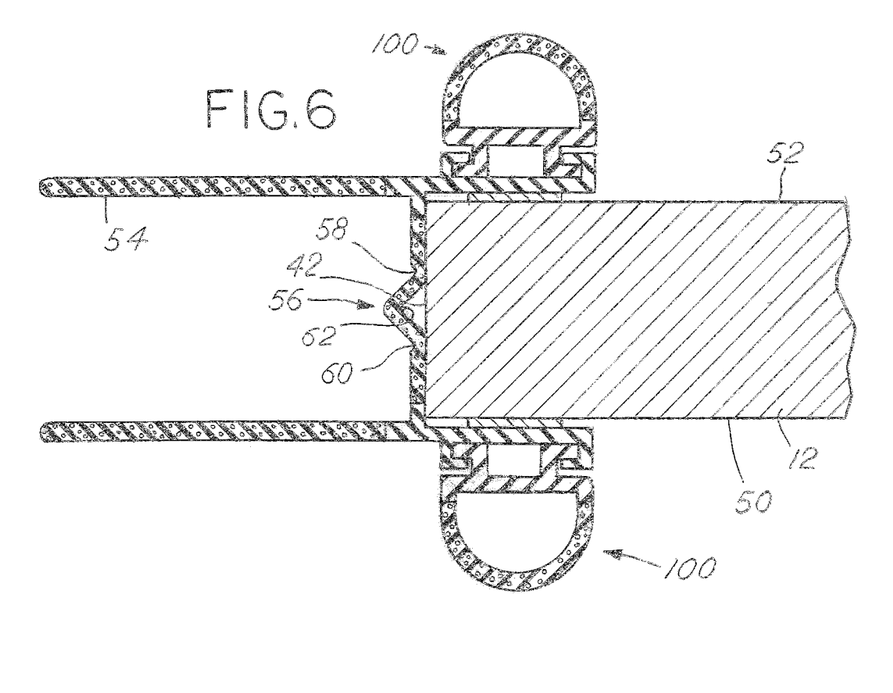
FIG. 6 is a sectional view of the seal with the replacement bulb seal.
Figure 7:
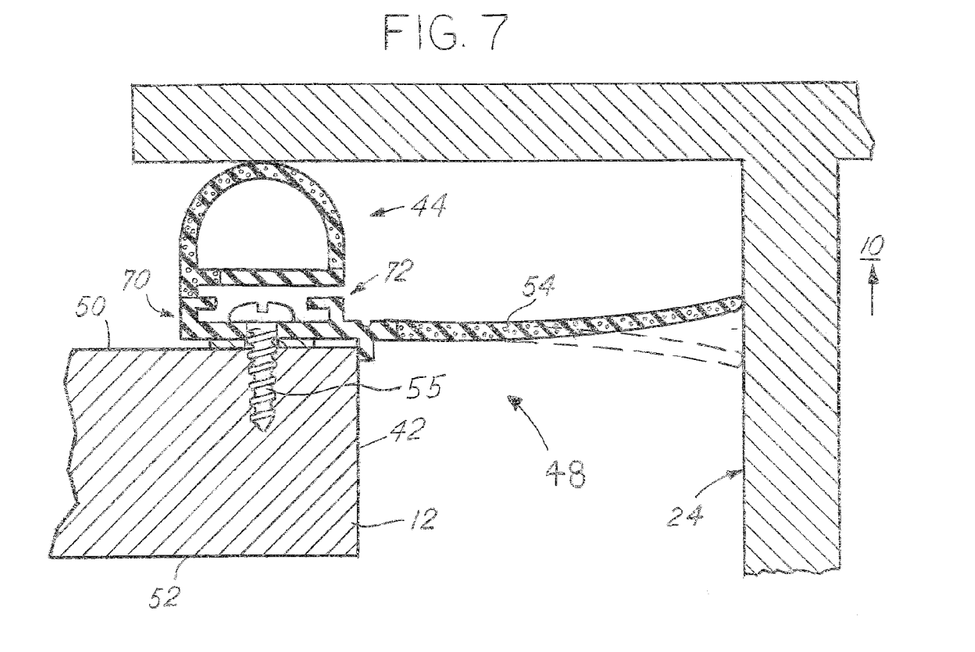
FIG. 7 is a sectional view of the seal in a single-side embodiment.
Figure 8:
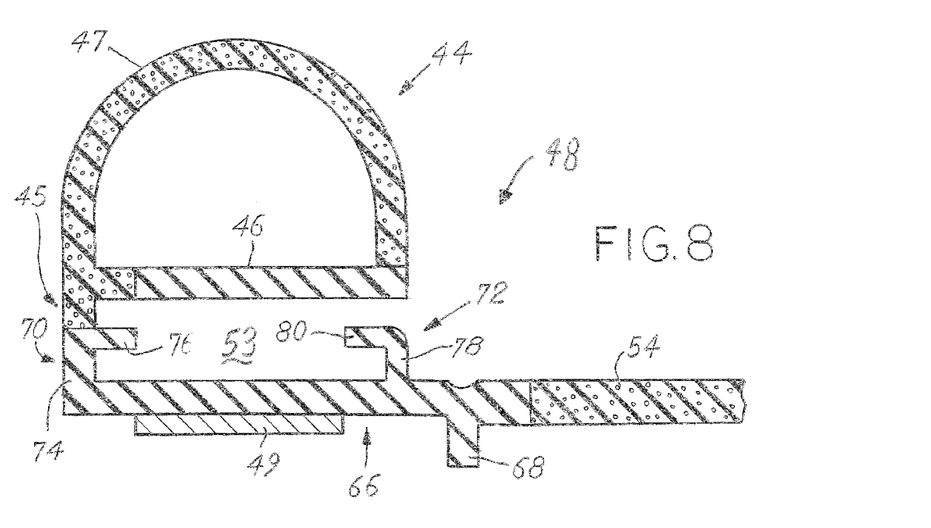
FIG. 8 is a close-up view of the seal in FIG. 7.
Figure 9:
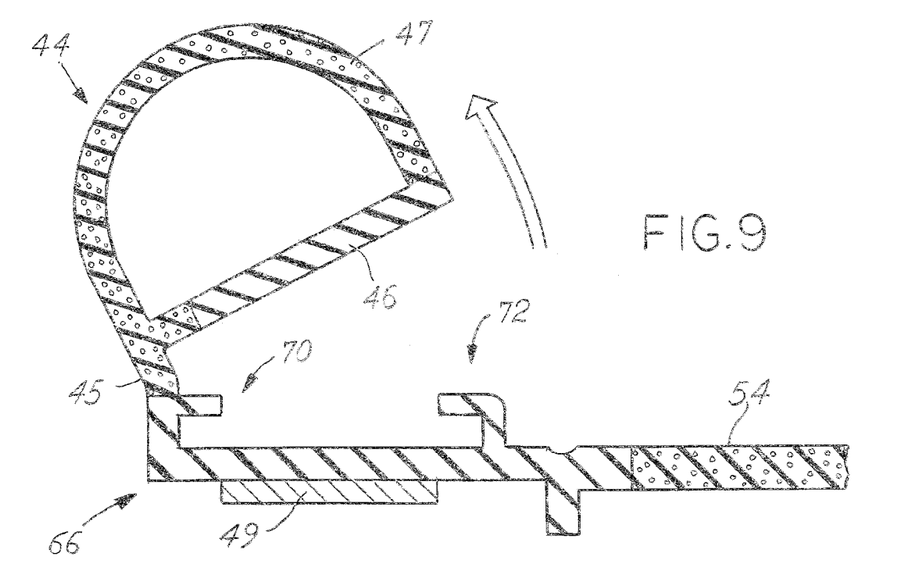
FIG. 9 is a close-up view of the seal in FIG. 8 with the bendable bulb portion in the position to be cut.

FIG. 4 shows the seal 35 in isometric as it is assembled onto a sidewall 12. Seal 35 has a pair of longitudinal attachment members 36, 38, which are connected by a longitudinal connecting member 40, which extends over the transverse edge 42 of the sidewall 12. The seal 48 has a single attachment member 66. Protruding from the attachment members 36, 38 are two L-shaped groove tabs 70, 72. The L-shaped groove tab 70 has an upstanding portion 74 and an overhang portion 76. The L-shaped groove tab 72 has an upstanding portion 78 and an overhang portion 80. Upstanding portion 78 is thinner than upstanding portion 74 as shown in FIGS. 5-10. Bulb portions 44 are integrally connected to the attachment members 36, 38, and 66, specifically the terminal end of the upstanding portion 74. An offsetting member 45 has a durometer that is lower than the attachment members 36, 38, 66 and spans between the bulb portion 44 to its corresponding terminal end of the upstanding portion 74. The offsetting members 45 extend perpendicularly to their respective mounting portions 36, 38. The bulb portions 44 have an inner wall 46 that has a higher durometer and an outer portion 47 with a lower durometer that is arcuately shaped. This is best shown in FIG. 8. The inner wall 46 is substantially parallel to the mounting portion for a majority of its length. The inner wall overlays its respective L-shaped tab 72. This is best shown in FIG. 8. The bulb portion 44 is hollow as shown in FIGS. 4-10 with the outer portion 47 made of a lower durometer material than the attachment members 36, 38, 66, or inner wall 46. Compression of the bulb portion 44 will cause a portion of the inner wall 46 to contact a corresponding L-shaped tab 72. The offsetting member 45 spaces the inner wall 46 from the attachment member 36, 38 by a predetermined distance. The offsetting member 45, adjacent to the bulb portion 44 is made from the same material as the outer portion 47. As such, the bulb portion 44, is easily bent back about the offsetting member 45 to expose the attachment member 36, 38. FIG. 9 shows the bent position. FIGS. 8 and 9 show the different materials as indicated by the hatching. The offsetting member 45, corresponding attachment member 36, 38, and inner wall 46 form a pocket 53 (FIG. 8) that is capable of hiding mechanical fasteners such as screws 55 driven through the mounting portions 36, 38. FIG. 7 illustrates this.

Different manufacturers of mobile living quarters manufacture the sidewalls 12 from different materials and thus, the sidewalls 12 of different manufacturers are of different thicknesses. It is clearly desirable that the number of different variations of the seal assembly 35 be minimized. Accordingly, an accordion pleat 56 extends along the length of the connecting member 40 to permit the width of the connecting member 40 to be adjusted, to thereby accommodate walls of varying thicknesses, as illustrated in FIGS. 5 and 6.

The single sided seal 48 is shown in FIGS. 7 through 10. This has the same structure as the embodiment shown in FIGS. 3 through 6 but lacks the connecting member 40. This allows the user to install the seal on one side only if desired, or both sides separately. The single sided seal 48 includes a stop 68 (FIG. 8) that is designed to overlay and directly contact the transverse edge 42.

In FIGS. 3 through 6, the seal 35 is in the "closed" or narrow position, to accommodate a relatively narrow sidewall. In this position, the accordion pleat 56 projects into the space between the wiper seals 54. When the assembly is in the "open" position, it accommodates a wider sidewall. In the open position, the accordion pleat 56 is stretched out so that the connecting member 40 lies substantially flat against the transverse edge 42. It will be noted that as the attachment members 36, 38 are secured to their corresponding inside and outside surfaces 52, 50, the width of the connecting member 40 automatically adjusts to accommodate a sidewall 12 of any thickness between those accommodated by the fully open and fully closed positions. The pleat 56 is formed by scoring parallel, longitudinal score lines 58, 60 on the side of the connecting member 40 facing away from the transverse edge 42 and between the wiper seals 54, and by forming a third longitudinal score line 62 on the side of the connecting portion 40 that lies against the transverse edge 42 when the seal assembly is installed on the sidewall. The third score line 62 extends parallel to the score lines 58, 60 and is located midway between the latter. The first 58, second 60, and third 62 score lines define corresponding first, second and third fold lines, thereby forming the accordion pleat 56.

To facilitate installation of the seal 35 on the unit 10, a strip of double sided adhesive tape 49, is connected to the attachment member 38 to the side facing the sidewall 12. The opposite side of the adhesive tape 49 that faces away from the attachment member 38 is covered by a protective removable coating that prevents it from sticking to anything. Likewise, the attachment member 36 includes a strip of double sided adhesive tape 49 attached to it and protected with a protective removable coating on the side that faces the side wall 12. For the single side seal 48, the tape 49 is located on attachment member 66.

After the adhesive tape is attached to the outer surface 50 and inner surface 52 of the side wall 12, the seal 35 may be more securely attached to the corresponding inside and outside surfaces 52 and 50 by appropriate mechanical fasteners as is shown in FIG. 7. Screws or nails may be driven through the attachment members 36, 38 into the side wall 12. This may be accomplished by bending back the bulb portions 44 to expose the attachment members 36, 38. Wiper seals 54 extend from the connecting portion 40 and are adapted to flex against the side walls 24 and ceiling wall 26 of the slide out room 20 during extension and retraction of the latter.

Figure 10:
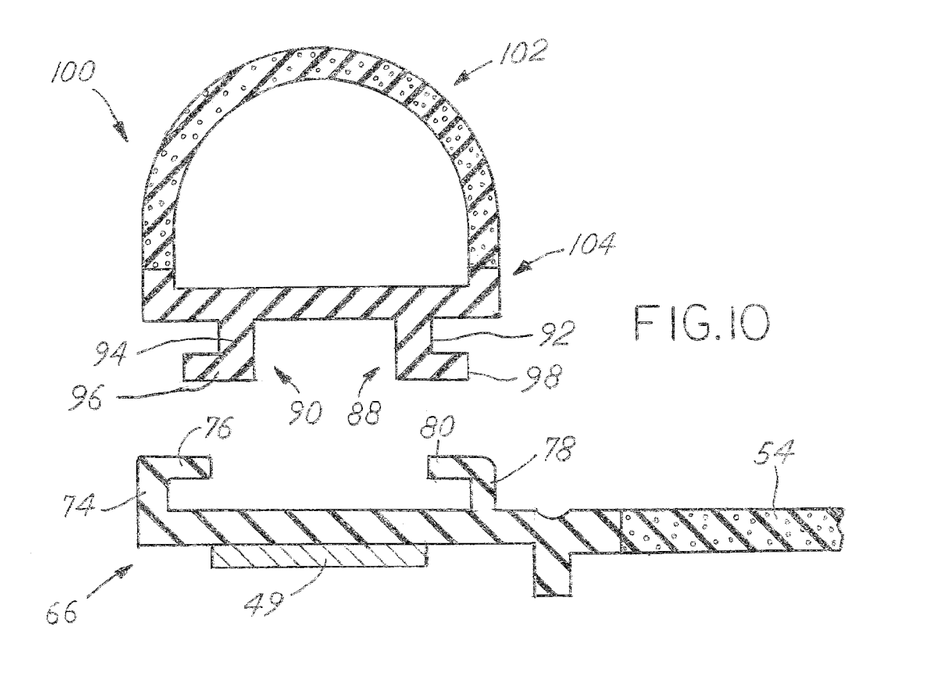
FIG. 10 is a close-up view of the seal in FIG. 9 with the bendable bulb portion removed and the replacement bulb seal before installation.

At some point, the user may desire to replace the bulb portion 44. This could be as a result of normal wear or damage. The user would bend back the bulb portion 44 as is shown in FIG. 9, pivoting it about the offsetting portion 45 and cutting it to separate it from the attachment portion 36, 38, or 66. Once the bulb portion 44 is separated from its attachment portion, the L-shaped tabs 70, 72 are revealed as is shown in FIG. 10. At that point, a bulb seal 100 can be installed as shown in FIG. 6. The bulb seal 100 has a bulb portion 102 and a mounting portion 104 shown best in FIG. 10. The mounting portion 104 has a pair of L-shaped tabs 88, 90 that are complimentary to the L-shaped tabs 70, 72 that are located on the attachment member 36, 38, and 66. The L-shaped tab 88, 90 has an upstanding portion 92, 94 and an overhang portion 96, 98 as shown in FIG. 10. The complimentary nature of the tongue and groove allows the user to install the bulb seal 100 by slidably attaching the bulb seal 100 to the attachment portion 36, 38, or 66.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A resilient seal for living quarters having main living area walls defining a main living area, an aperture in one of said main living area walls slidably receiving a slide out room having slide out room walls defining auxiliary living space, said one main living area wall having an outside surface, an inside surface, and a transverse surface extending between said inside and outside surfaces, said transverse surface defining said aperture, said resilient seal comprising:

a pair of attaching members adapted to extend along said one main living area wall adjacent to said aperture;

each attaching member of said pair having a groove connector having a pair of upstanding walls extending from and substantially perpendicular to said attaching member, each said upstanding wall terminating in a corresponding overhanging wall being substantially parallel to and spaced from said attaching member and forming an L-shaped tab, said L-shaped tabs cooperating to form said groove;

a connecting member extending between said attaching members and adapted to be located along said transverse surface;

each said attaching member having a bulb portion integrally attached to one of said L-shaped tabs by an offsetting member spacing said bulb portion from its corresponding attachment member, said bulb portion including an inner wall and an arcuate outer portion, a first portion of said inner wall is formed from a higher durometer material than said arcuate outer portion, a second portion of said inner wall adjacent said offsetting member and said offsetting member is formed from a lower durometer material than said first portion of said inner wall, said bulb portion hingeably moveable about said offsetting member between a resting position locating said inner wall relatively near said L-shaped tabs and a bent position wherein said inner wall is located relatively far from said L-shaped tabs, said bulb portion overlaying said groove connector in said resting position.

2. The resilient seal of claim 1, wherein said connecting member has an adjuster for adjusting a distance between said attaching members.

3. The resilient seal of claim 2, wherein said adjuster includes an accordion pleat defined between first and second parallel score lines defining a pair of corresponding fold lines, and a third score line defining a third fold line between and extending parallel to said first and second score lines.

4. The resilient seal as claimed in claim 1, wherein said seal includes a wiper seal extending outwardly therefrom and adapted for engaging one of said slide out room walls.

5. The resilient seal as claimed in claim 4, wherein said a wiper seal extends substantially perpendicularly from said connecting member.

6. The resilient seal of claim 1, wherein said attaching member includes a wiper seal integrally extending outwardly therefrom and adapted for engaging one of said slide out room walls.

7. A resilient seal for living quarters having main living area walls defining a main living area, an aperture in one of said main living area walls slidably receiving a slide out room having slide out room walls defining auxiliary living space, said one main living area wall having an outside surface, an inside surface, and a transverse surface extending between said inside and outside surfaces, said transverse surface defining said aperture, said resilient seal comprising:

an attaching member adapted to extend along said one main living area wall adjacent to said aperture;

said attaching member having a groove connector having a pair of upstanding walls extending from and substantially perpendicular to said attaching member, each said upstanding wall terminating in a corresponding overhanging wall being substantially parallel to and spaced from said attaching member and forming an L-shaped tab, said L-shaped tabs cooperating to form said groove;

said attaching member having a bulb portion integrally attached to one of said upstanding walls by an offsetting member spacing said bulb portion from said attachment member, said bulb portion including an inner wall and an arcuate outer portion, a first portion of said inner wall is formed from a higher durometer material than said arcuate outer portion, a second portion of said inner wall adjacent said offsetting member and said offsetting member is formed from a lower durometer material than said first portion of said inner wall; and said bulb portion hingeably moveable about said offsetting member between a resting position locating said inner wall relatively near said L-shaped tabs and a bent position wherein said inner wall is located relatively far from said L-shaped tabs, said bulb portion overlaying said groove connector in said resting position.

8. The resilient seal of claim 7, wherein said attaching member includes a stop extending perpendicularly therefrom in a direction opposite said upstanding walls.

9. The resilient seal of claim 7, wherein said attaching member includes a wiper seal integrally extending outwardly therefrom.

10. The resilient seal of claim 7, wherein said seal has a pair of attaching members.

11. The resilient seal of claim 10, further comprising a connecting member integrally affixed to and extending between said pair of attaching members, said connecting member adapted to be located along said transverse surface.

12. The resilient seal of claim 11, wherein said connecting member has an adjuster for adjusting a distance between said attaching members.

13. The resilient seal of claim 12, wherein said adjuster includes an accordion pleat defined between first and second parallel score lines defining a pair of corresponding fold lines, and a third score line defining a third fold line between and extending parallel to said first and second score lines.

* * * * *